Jan. 21, 1936.  A. RICE  2,028,522
DISPLAY DEVICE
Filed Oct. 23, 1933  4 Sheets-Sheet 1
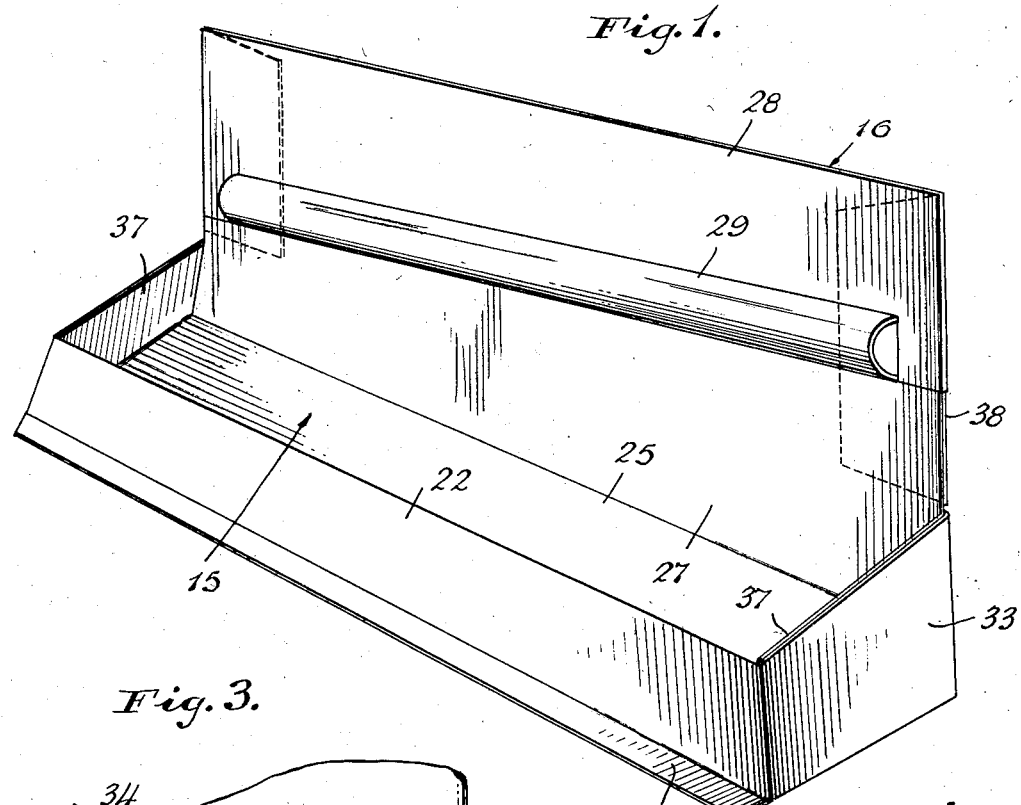
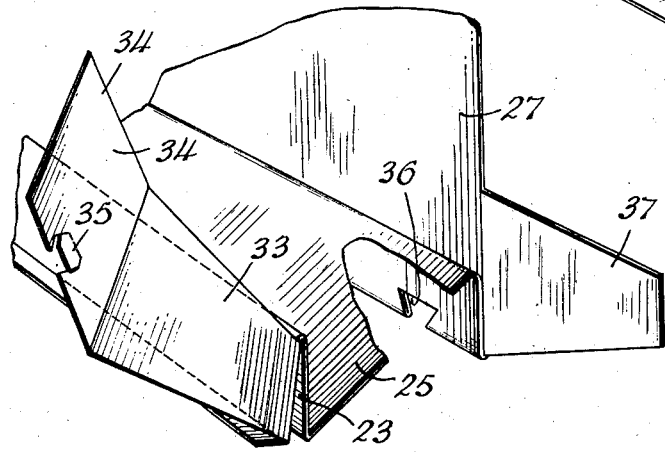
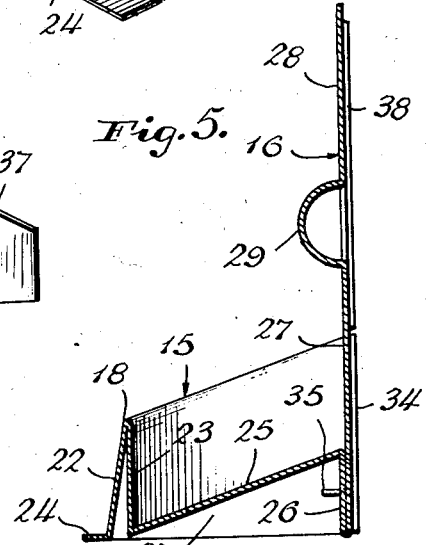
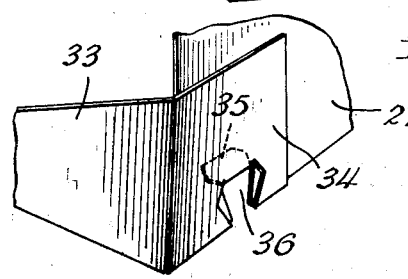
INVENTOR
ALEXANDER RICE
BY
ATTORNEYS Jan. 21, 1936. A. RICE 2,028,522
DISPLAY DEVICE
Filed Oct. 23, 1933 4 Sheets-Sheet 2
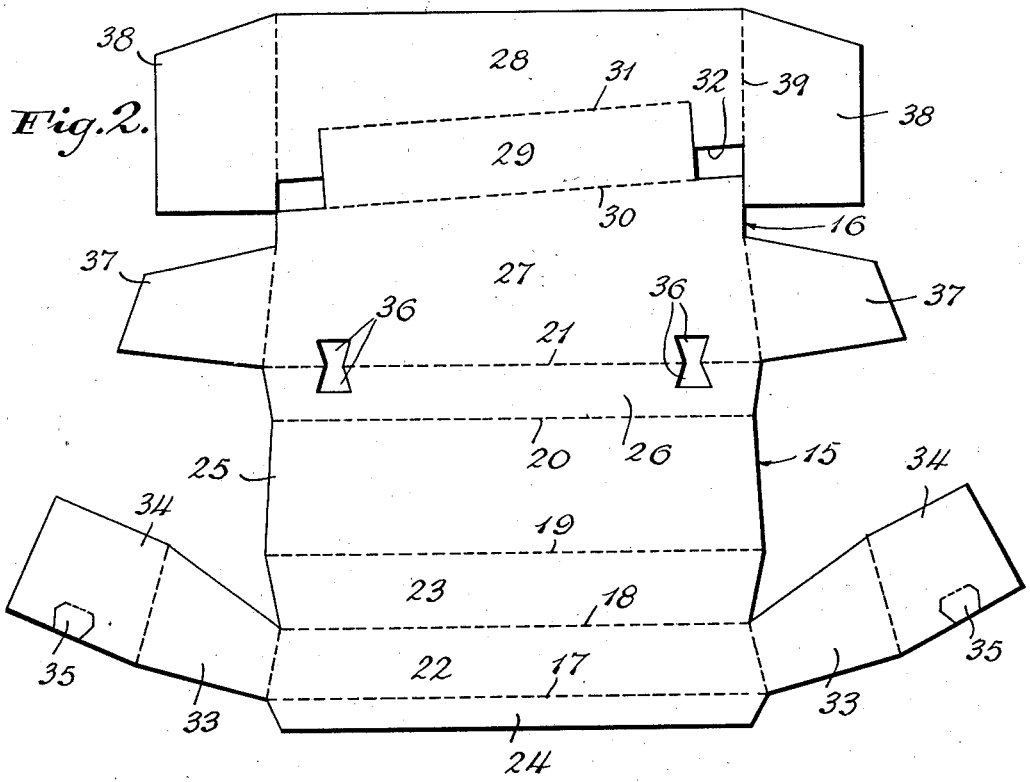
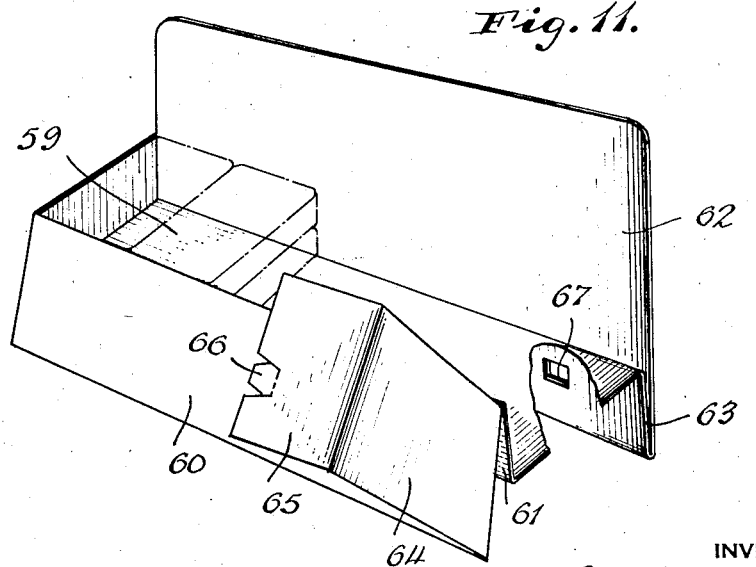
INVENTOR
ALEXANDER RICE
BY
ATTORNEYS Jan. 21, 1936. A. RICE 2,028,522
DISPLAY DEVICE
Filed Oct. 23, 1933 4 Sheets-Sheet 3

INVENTOR
ALEXANDER RICE
BY
ATTORNEYS

Jan. 21, 1936.                A. RICE                 2,028,522
                           DISPLAY DEVICE
                    Filed Oct. 23, 1933    4 Sheets—Sheet 4
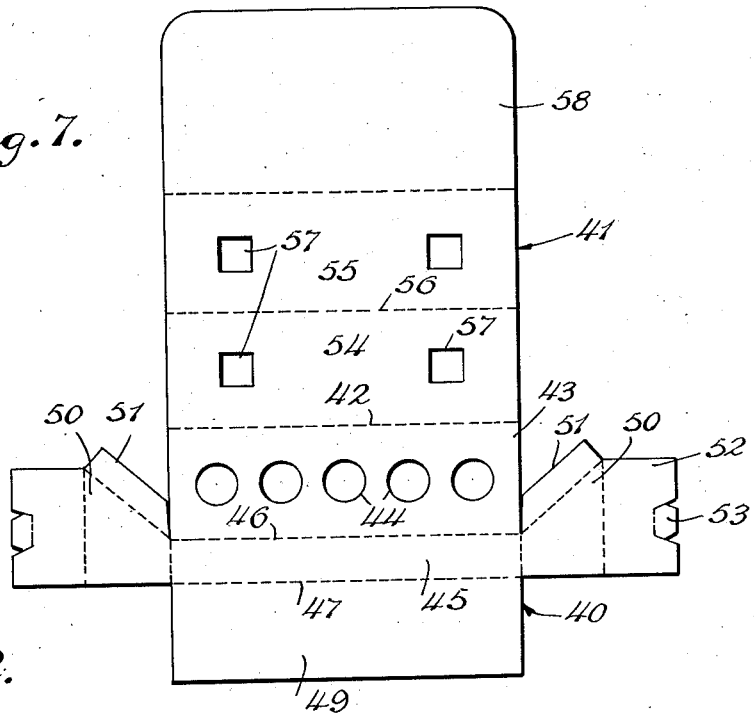
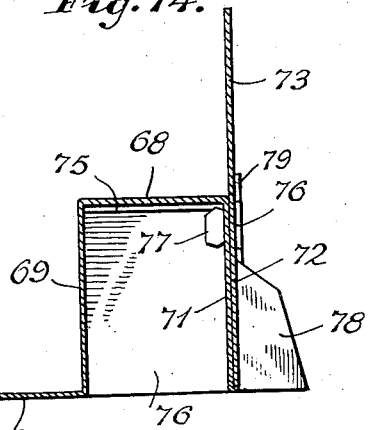
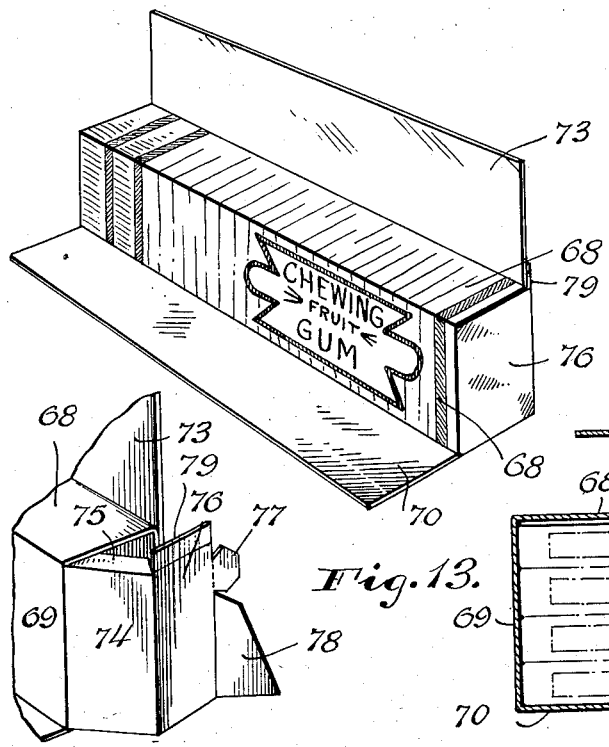
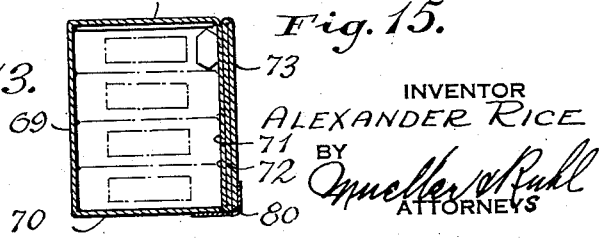
INVENTOR
ALEXANDER RICE
BY
ATTORNEYS Patented Jan. 21, 1936

2,028,522

UNITED STATES PATENT OFFICE 2,028,522

DISPLAY DEVICE

Alexander Rice, Brooklyn, N. Y., assignor to Juxto-Display Corporation, New York, N. Y., a corporation of New York Application October 23, 1933, Serial No. 694,699

4 Claims. (Cl. 206—44)

This invention relates to improvements in display devices and has particular reference to counter displays such as used in advertising various articles of merchandise.

An object of the invention is to provide an improved device of simple, practical and inexpensive construction which will constitute an effective means of displaying different articles or simulations thereof.

Another object is to form a display device from a single blank of material which is so cut and scored that when the same is properly folded and the elements thereof assembled, a body portion will be provided which will be sufficiently rigid to form a receptacle for receiving various articles for display purposes.

The above and other objects will appear more clearly from the following detailed description when taken in connection with the accompanying drawings, which illustrate preferred embodiments of the inventive idea.

In the drawings:—

Figure 1 is a perspective view of a display device constructed in accordance with the invention and showing one modification thereof.

Figure 2 is a plan view of the blank from which the device of Figure 1 is formed.

Figure 3 is a fragmentary perspective view of one end of the device in a partially set-up position.

Figure 4 is a fragmentary perspective of one end of the back of the device showing the means for retaining elements thereof in set-up position.

Figure 5 is a vertical transverse section through the device of Figure 1.

Figure 7 is a plan view of the blank from which the device of Figure 6 is formed.

Figure 11 is a perspective view of another form of the invention, partly in an assembled position.

Figure 12 is a perspective view of still another form of the invention.

Figure 13 is a fragmentary perspective view of one end of the device of Figure 12 in a partially set-up position.

Figure 14 is a vertical transverse section through the latter device, and

Figure 15 is a section similar to Figure 14 showing the device in a folded position, as when the device is used as a shipping container.

Figure 6:
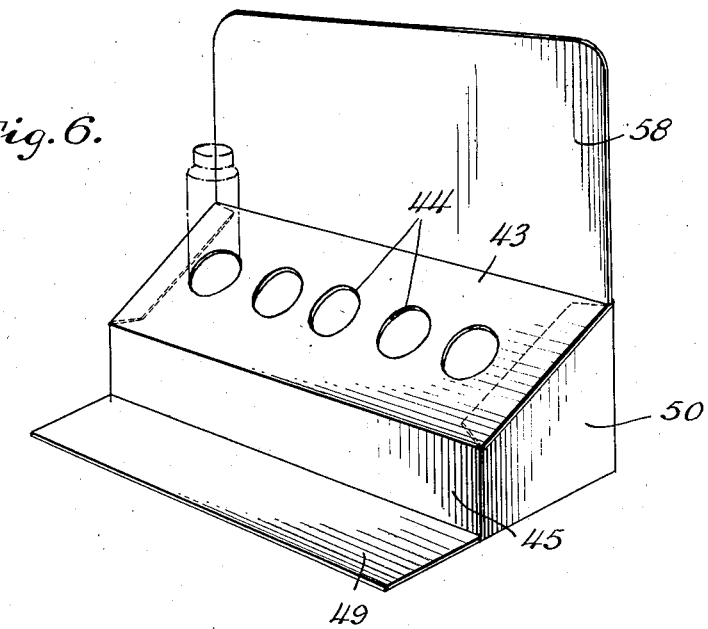
Figure 6 is a perspective view of another form of display device.

Referring to the form of the invention shown in Figures 1 to 5 inclusive, and by particular reference to Figure 2, it will be seen that the display device is formed from a single blank of material which may be cardboard or other suitable material which lends itself to bending and folding operations without breakage at the folding lines. The material is cut and scored to provide, generally, a body portion 15 and a back 16. In the present instance, the body portion, when folded, is adapted to assume the form of a rectangular receptacle for receiving various articles of merchandise, and to this end the blank is scored along the transverse lines 17, 18, 19, 20, and 21. The front wall of the receptacle is formed by the sections 22 and 23 defined by the score lines 17, 18, and 19, and these two sections are folded upon the intermediate line 18, as shown in Figure 5, so as to extend downwardly from said folding line. If desired, the folding line 17 may be so positioned with respect to the end of the blank that a flange 24 is provided at the bottom edge of the outer section 22 of said front wall which flange will rest upon the support on which the device is mounted so as to provide an additional bracing means therefor. The bottom 25 of the receptacle is formed by the folding lines 19 and 20 and is preferably inclined upwardly toward the rear of the device so that articles within the receptacle may be more readily visible when on display. At the line 20 the blank is folded downwardly and then upwardly at the line 21 to define a section 26 of the back 16 which depends from the bottom 25 to form a support therefor and which is reinforced by that portion of the back which abuts said section by reason of the fold on the line 21. In other words, the material of the blank is doubled upon itself at this point so as to form a supporting portion for the device of sufficient rigidity to cooperate with the doubled front wall to maintain said device in its set-up position. The back of the device, which may be said to extend from the fold line 20 to the upper end of the blank, as viewed in Figure 2, comprises, in addition to the section 26, the lower and upper normally spaced sections 27 and 28 and an intermediate section 29 joined to said sections 27 and 28 at the fold lines 30 and 31. The intermediate section 29 is utilized, as will appear in the course of the description, to simulate an article of merchandise such as, for instance, an article which might be on display within the receptacle of the device. Said section 29 is of less length than the sections 27 and 28 and the latter sections are normally spaced from each other by cutting away the material of the blank as indicated at 32, thus affording a space between said sections 27 and 28 whereby the same may be moved toward each other when setting up the device.

The body portion 15 is completed by end members 33 extending from the ends of the outer section 22 of the front wall of said receptacle and each of said end closures, which form the end walls of the receptacle, is provided with a securing flap 34 having a locking tab 35 struck from one edge thereof and adapted to cooperate with connected openings 36 formed in the sections 26 and 27 and intersecting the fold line 21. Associated with the end members 33 are reinforcing flaps 37 projecting from the ends of the section 27. To complete the blank, the top or upper section 28 of the back is provided at each end with a securing flap 38 which is foldable, when the device is set up, upon the longitudinal score line 39 so as to engage the rear surface of the section 28, the flap 38 being of such length that the same overlaps the adjacent section 27.

When assembling the device formed from the blank of Figure 2, said blank is first folded upon the line 21 so as to bring the section 26 and the lower portion of the section 27 into abutting relation, as shown in Figure 5. The bottom 25 is then formed by folding upon the lines 20 and 19 after which the necessary folds are made on the lines 18 and 17 to form the doubled front wall of the receptacle. The reinforcing flaps 37 are then turned inwardly and forwardly upon their respective fold lines so that the forward or free ends of said flaps will engage with the inner section 23 of the front wall, after which the end closures 33 are folded rearwardly. The flaps 34 are then turned inwardly against the section 27 of the back, whereupon the tabs 35 are inserted through the then registered openings 36 to lock the flaps 34 to the back of the device so that the end closures 33 are securely held in position.

The back of the device is then completed by forcing the upper section 28 downwardly into juxtaposition to the section 27 at which time the spaced longitudinal edges of the cutaway portions 32 will come into abutting relation so as to, in effect, make the two sections 27 and 28 continuous. When thus moving the sections 27 and 28 toward each other the intermediate section 29 will be bent or bowed so as to assume the position shown in Figure 1. In the present instance, the section 29 is designed to represent a cigarette and when said section is so bent it projects laterally from the back 16 in offset relation thereto and in this position simulates a three-dimensional figure. As a final operation in setting up the display devices, the flaps 38, which are provided upon the surfaces thereof which abut against the back of the devices with an adhesive, are folded back as indicated, whereupon the same will overlap the meeting edges of the sections 27 and 28 and thus secure the same in their adjusted positions so that the section 29 will be maintained in its offset relation to the back of the device.

Figure 8:
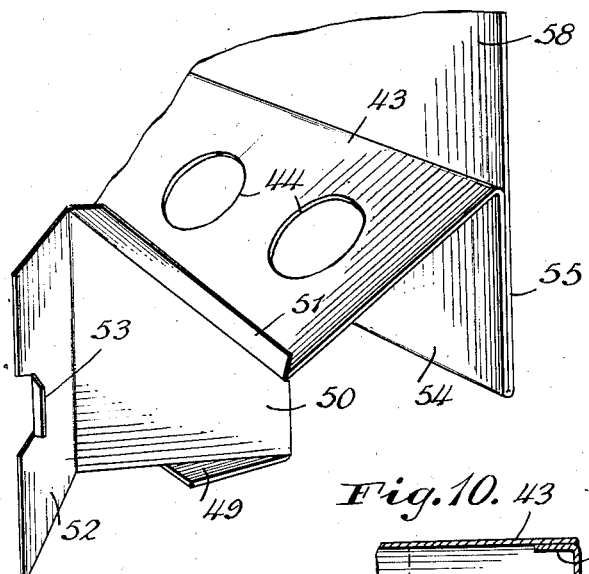
Figure 8 is a fragmentary perspective of the device in partially assembled position.
Figure 9:
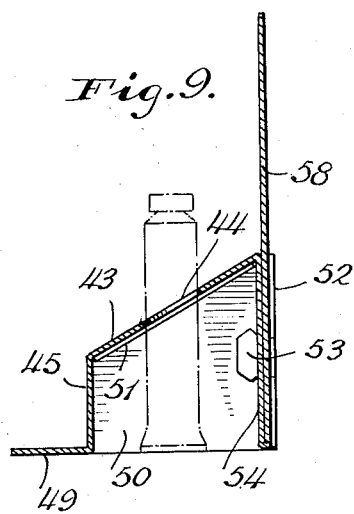
Figure 9 is a vertical transverse section through the device of Figure 6.
Figure 10:
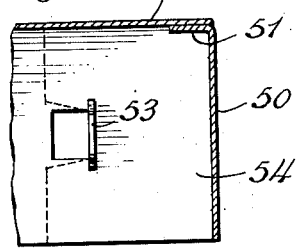
Figure 10 is a fragmentary sectional view showing the securing or locking means for maintaining the device in its set-up position.

In the form of the invention shown in Figures 6 to 10, the blank as shown in Figure 7 is scored transversely to provide the body portion generally indicated by the numeral 40 and the back designated by the numeral 41, the fold line 42 defining the meeting edges of the said two portions. The body portion comprises a section 43, preferably inclined when the device is assembled, and adapted to receive articles of merchandise such as the tubes indicated in broken lines in Figures 6 and 9. For this purpose said section is provided with a series of openings 44 into each of which one of the tubes may be inserted with its bottom resting upon the support on which the device is mounted so that said tubes will be mounted in a vertical position. A front wall section 45 is formed by the fold lines 46 and 47, the latter being spaced from the adjacent end of the blank so as to provide a supporting flap 49. End members 50 extend from the ends of the section 45 and each of said end members is provided with a reinforcing flap 51 adapted to engage the under surface of the section 43. Each end member 50 is also provided with a securing flap 52 having a lock tab 53, said flap being the equivalent of the flap 34 of Figure 2. The back of the device comprises the two sections 54 and 55 having an intervening fold line 56 upon which said sections are folded into abutting relation with each other as shown in Figures 8 and 9. Pairs of openings 57 formed in the two sections 54 and 55 are brought into alignment when said sections are folded and are adapted to receive the locking tabs 53 of the flaps 52 when the latter are folded against the back of the device. The back further includes the upper section 58 which extends above the free or rear edge of the display section 43 and which may contain suitable advertising indicia. From the previous description it is believed that the assembling or setting up of the device to the position in Figures 6 and 9 will be obvious.

Figure 11 illustrates a form of the device somewhat similar to that shown in Figure 1 and differs therefrom only in the elimination of the article-simulating portion of the back and the reinforcing flaps 37. In other words, the device comprises a body portion consisting of a bottom 59, a front wall including outer and inner sections 60 and 61, and a rear wall 62 a portion of which is doubled upon itself as indicated at 63. At each end of the outer section 60 of the front wall the same has extending therefrom an end member 64 which is adapted to close one end of the body portion of the device. A securing flap 65 on the free end of each of the end members 64 is foldable in the same manner as the flaps 34 and 52 and is provided with a locking tab 66 which is inserted through adjacent registering openings 67 formed in the double portion 63 of the back.

In the form of the invention shown in Figures 12 to 15, the blank from which the device is formed is scored to provide intermediate sections 68 and 69 which constitute the body portion of the device and which may be illustrated in any desired manner to simulate various articles of merchandise. The blank further comprises a front supporting section 70 and the rear supporting sections 71 and 72. These latter sections are in abutting relation and form a portion of the back, the remainder of which consists of a section 73 extending above the section 68. At each end of the front section 69 the same is provided with an end member 74 having a reinforcing flap 75 adapted to engage the under surface of the section 68 when the device is assembled. The end member is further provided with a flap 76 similar to the flaps 34, 52, and 65, and said flap 76 is formed along its free vertical edge with a locking tab 77 adapted to be inserted through registering openings in the sections 71 and 72. Also projecting from the free vertical edge of each flap 76 is another flap 78 which projects rearwardly from the back of the device when the latter is set up so as to constitute an easel which provides an additional support for the device. When the device is to be used as a shipping container, as shown in Figure 15, which is thereafter capable of being set up in display position, the section 70 is turned under to form a bottom for the container and the section 73 is turned down. The adjacent edges of said sections are then secured together by an adhesive strip 80 which may be severed when the device is to be placed in display position, as illustrated in Figure 14. When in the latter position, the section 73 is braced by a flap 79 forming an extension of the flap 76.

What is claimed is:

1. A display device formed from a single blank of material cut and scored to provide a body adapted for the display of articles of merchandise and simulations thereof, said body having a rear wall formed by folding two portions of said blank against each other and extending one of said portions above the body to constitute a back for the device, said two portions having openings therein which register with each other when the portions are folded, and end members for the said body having flaps provided with tabs insertable through said registered openings and bendable into engagement with one of said portions to thereto and thereby maintain said end members in position.

2. A display device formed from a single blank of material cut and scored to provide a body adapted for the display of articles of merchandise and simulations thereof, said body having a rear wall formed by folding two portions of said blank against each other and extending one of said portions above the body to constitute a back for the device, end members for said body having flaps provided with securing tabs insertible through openings formed in said portions to fasten said flaps against said portions to thereby maintain said end members in position, and supporting members carried by said flaps and extending laterally therefrom to form an easel for the device.

3. A display device formed from a single blank of material cut and scored to provide, when folded, a body having front and rear walls and an intermediate portion adapted to receive articles of merchandise for display purposes, said rear wall formed by doubling portions of said blank and extending one of said portions to provide a back for the device which projects above said body, and said doubled portions having registering openings therein, end members carried by the front wall and having flaps foldable against said rear wall, and tabs formed on said flaps and insertable into said openings for fastening said flaps and end members in operative positions.

4. A display device formed from a single blank of material cut and scored to provide a body, said body having a rear wall formed by folding two portions of said blank against each other and extending one of said portions above the body to constitute a back for the device capable of being folded down upon said portion, said body also having a front provided with a laterally extending supporting section capable of being folded under to provide a bottom for said body, end members for the body having flaps provided with means which cooperate with said rear wall to secure said flaps thereto, and another flap on each of the last-named flaps engageable with said back to brace the same when it is extended above the body.

ALEXANDER RICE.